(12) United States Patent
de Vito et al.

(10) Patent No.: US 6,690,797 B1
(45) Date of Patent: Feb. 10, 2004

(54) DESCRAMBLING DEVICE FOR THE USE OF SEVERAL CONDITIONAL ACCESS SUB-SYSTEMS

(75) Inventors: Mario de Vito, Geveze (FR); Laurent Gauche, Chantepie (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/362,154

(22) Filed: Jul. 28, 1999

Related U.S. Application Data
(60) Provisional application No. 60/094,357, filed on Jul. 28, 1998.

(51) Int. Cl.[7] .................................................. H04L 9/00
(52) U.S. Cl. ...................... 380/240; 380/212; 380/228; 380/233; 380/241; 380/239
(58) Field of Search ................................ 380/240, 241, 380/28, 262, 201, 204, 239, 258, 226, 212, 29, 264, 228, 233; 713/201

(56) References Cited

U.S. PATENT DOCUMENTS

| | | | |
|---|---|---|---|
| 4,491,909 A | * 1/1985 | Shimizu | ..................... 711/147 |
| 5,144,662 A | 9/1992 | Welmer | |
| 6,216,102 B1 | * 4/2001 | Martino et al. | ................. 704/9 |
| 6,457,106 B1 | * 9/2002 | Watanabe | ................... 711/147 |

FOREIGN PATENT DOCUMENTS

WO       96/08912       3/1996

OTHER PUBLICATIONS

Okoth, I., Schneider, R., Leroux, J.Y.: "DVB: Common Interface Asl Ideable Interaktive Multimedia–Umgebung" Fernseh– und Kinotechnik, vol. 12, 1997, pp. 854–856. *Translation included*.

Cutts, DJ: "DVD Conditional Access", Electronics and Communication Engineering Journal, vol. 9, No. 1, Feb. 1997, pp. 21–27.

Okoth, I., Schneider,R., Leroux,J.Y.: "DVB: Common Interface ALS Ideable Interaktive multimedia–Umgebung", Fernseh– Und Kinotechnik vol. 12, 1997 pp. 854–856 Translation Not Included.

"Digital TV Towards Routine Accesss to Pay–Type Multimedia Services", Electronique International, No. 310, Jun. 1998, p. 42 Translation Included.

European search report dated Dec. 18, 1998.

* cited by examiner

*Primary Examiner*—Ly V. Hua
(74) *Attorney, Agent, or Firm*—Joseph S. Tripoli; Paul P. Kiel

(57) ABSTRACT

The descrambling device comprises hardware resources (1) and first memory zones (CA1, CA2, . . . , CAn) to store at least two different access control codes for controlling the hardware resources. The device also contains an arbitration code for selecting one access control code to control the hardware resources in order to share access to the hardware resources from the access control codes. Access control codes can be downloaded in the first memory zones by means of a loader contained in the device.

9 Claims, 1 Drawing Sheet

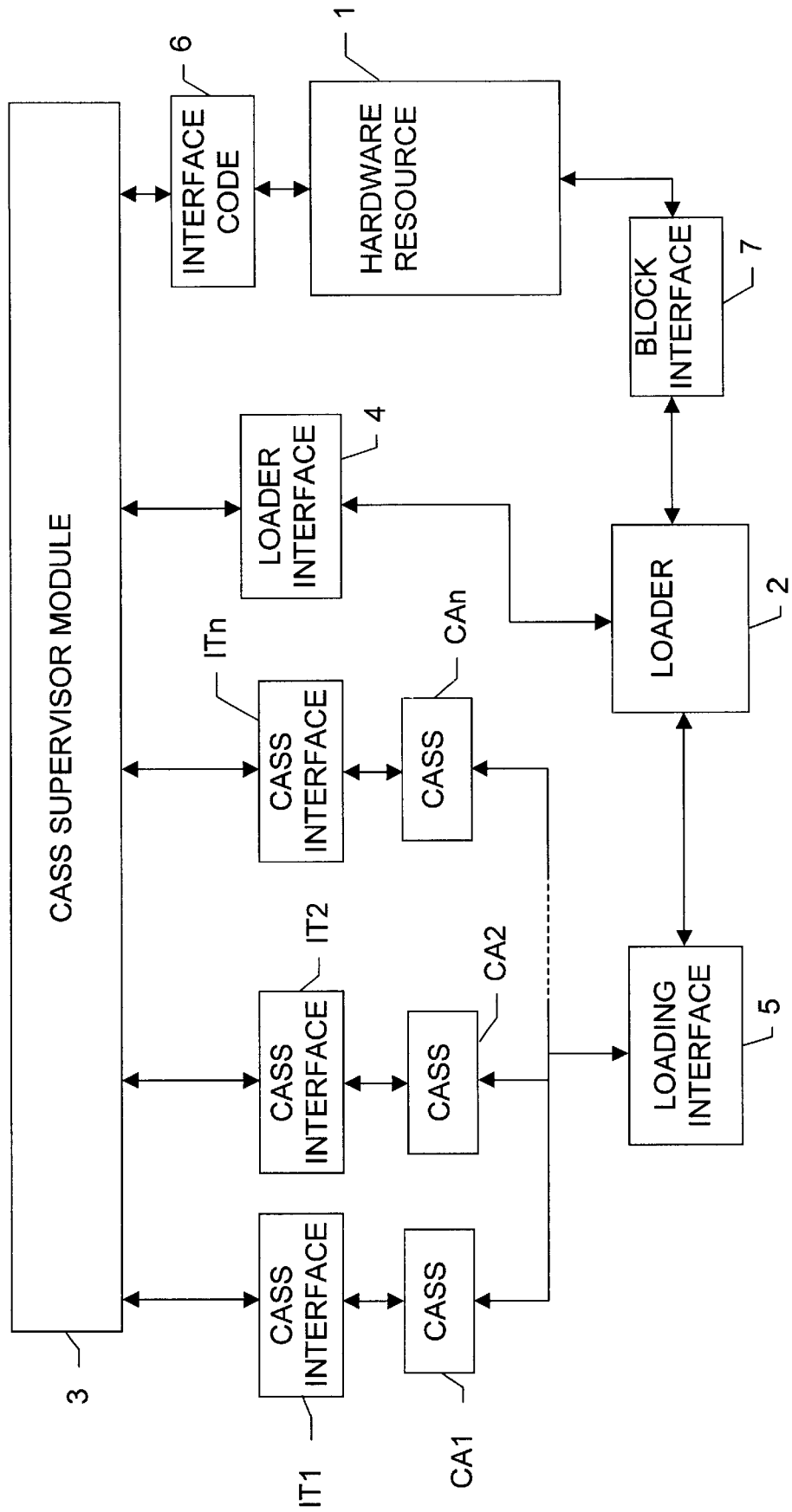

DESCRAMBLING DEVICE FOR THE USE OF SEVERAL CONDITIONAL ACCESS SUB-SYSTEMS

This original application claims priority to U.S. provisional application No. 60/094,357, filed on Jul. 28, 1998, in the name of DeVito et al.

BACKGROUND OF THE INVENTION

The invention relates to a conditional access system and, more particularly, to a descrambling device intended to be compatible with several conditional access sub-systems. Such a device can be included, for example, in a pay-TV decoder.

A conditional access sub-system (CASS) is an access control code (software part) that controls a descrambling circuit (hardware part).

A CASS carries out different functions such as, for example, the processing of the Entitlement Control Messages (ECM) that contain the ciphered descrambling keys and the processing of the Entitlement Management Messages (EMM) that contain the users entitlements.

In many cases, a pay-TV decoder contains a single CASS specific, for example, to a Network Operator.

In other cases, pay-TV decoders have to allow the use of different CASS. Then, such decoders use a standard DVB-CI interface. A standard DVB-CI interface is a PCMCIA module that contains one CASS.

The decoder itself may no more contain any conditional access part. When a TV viewer wants to use a specific CASS, he must take the right DVB-CI interface module and plug it into the decoder.

Such a system is expensive (there is a cost for each DVB-CI interface module), not ergonomic (many manipulations are required to use several conditional access sub-systems) and rather slow (a dialog is necessary between the DVB-CI interface module and the decoder).

The invention does not have these drawbacks.

SUMMARY OF THE INVENTION

The invention concerns a descrambling device comprising hardware resources and first memory zones to store at least two different access control codes for controlling the hardware resources. The hardware resources are shared between the different access control codes thanks to an arbitration code stored in a CASS supervisor module.

The invention concerns also a method for descrambling scrambled data by means of an access control code controlling hardware resources. The method comprises a step to allow at least one other access control code to control the hardware resources through an arbitration code.

According to an improvement of the invention, access control codes can be downloaded in the first memory zones by means of a loader contained in the device.

The invention will be better understood in view of the description herein below and the accompanying FIGURE which is given as non-limiting example.

BRIEF DESCRIPTION OF THE DRAWING

The single FIGURE is a block diagram of a descrambling device of the invention.

DESCRIPTION OF THE PREFERRED EMBODIMENT

The FIGURE shows a descrambling device according to the invention comprising hardware resources 1 that contain, among other things:

a smart card reader whose purpose is to receive access smart cards, filters whose purpose is to filter the data (ECM, EMM) which are corresponding to the access control(s) the user wants to carry out, and a descrambling circuit.

In some cases, the descrambling circuit is not part of the hardware but part of the software. The invention concerns also these cases.

The descrambling device further comprises several access control codes (i.e. several CASS) and a CASS supervisor module 3 that contains an arbitration code for selecting which access control code has access to the hardware resources 1 according, for example, to the program (provided by one particular Network Operator) selected by the user.

According to the invention, the arbitration code allows at least two different access control codes (i.e. two CASS) to share the access control hardware resources 1. It is therefore possible for at least two access control codes to work simultaneously.

Each access control code is stored in a memory zone CAi ($i=1, 2, \ldots, n$). For each access control code stored in a memory zone CAi, an interface code stored in a memory zone ITi allows to interface an access control code and the arbitration code.

The interface code stored in a memory zone ITi allows to realize the whole or a part of the following actions:

to dialog with the smart card(s) usable with the decoder;

to set filters on the demultiplexer;

to call a remote server by means of a modem;

to dialog with a server linked to a serial or a parallel port;

to program an alarm at an expected date to switch on the decoder;

to run some Operating System Resources like, for example, message queues, semaphores, . . .

According to the here-above mentioned improvement of the invention, a loader 2 controls the way new access control codes can be downloaded from a server. Particularly the loader allows the addition, the suppression or the replacement of one or several access control code(s). Addition, suppression and replacement of access control codes are carried out independently of other existing codes or pieces of software stored in the decoder. A loading interface code stored in a memory zone 5 allows the loader to write in the right memory zone the data blocks which compose the access control code to be downloaded. A loader interface code stored in a memory zone 4 indicates via which means the data blocks have to be downloaded and the address of the desired server accessible via this means. The loader interface code also controls the start and the stopping of the downloading.

The loader solves the dynamic linking issue for the 3 following cases:

1) If the access control code to download is independent from its loading memory address, the code is simply downloaded and stored in a free CAi memory zone.

2) If the access control code can be relocated, the loader identifies the zones of the received access control code whose content depends on the loading address and defines them.

3) If the access control code cannot be relocated and depends on its loading address, the access control code server and the decoder have to agree upon a loading address. The access control code is then compiled on the server at the agreed address before to be downloaded. A variant is to define as many compiled access control codes as loading addresses in the decoder.

In case the access control codes are not native code but an interpreted one such as, for example, the code produced by the JAVA™ interpreter from the company SUN Microsystems, one alternative embodiment of the invention consists in loading interpreted code.

If requested by the arbitration code, the loader is capable to be linked to different servers available on different networks like, for example, the telephone network (the link is then a modem), the broadcasting network (the link is then the usual port through which broadcast programs are received), local networks (the link is then, for example, the RS232 serial port or the P1284 parallel port).

The loader sends to the remote server both description of the object code and the description of the RAM variables.

The server fits the more favorable mode and sends sequentially, via a block interface 7, all the data blocks which compose an access control code after being concatenated.

According to an improvement of the invention, the arbitration code controls a menu specific to an access control function, which menu offers different points to accede to available access control codes. This menu can contain an offer to download new access control codes via one of the previous ports here above mentioned: modem, serial port, parallel port, broadcast programs port, . . .

An interface code stored in a memory zone 6 allows at least one available access control code to control the hardware resources 1 via the arbitration code.

The, actions allowed by the interface code stored in the memory zone 6 are, for example:

MPEG 2 system packets and sections demultiplexing;

programming of the control words in the descrambling circuit;

smart card control;

access to the modem;

access to the date and the alarm allowing to switch on the decoder, etc . . .

The access control descriptors contained in the Program Map Table (PMT) of the selected service as well as the access control descriptors contained in the Conditional Access Table (CAT) of the selected transport stream are sent to the arbitration code.

As mentioned above, a descrambling device according to the invention can be part of a pay-TV decoder. However, a descrambling device according to the invention can also be part, for example, of a TV set, a VCR (VCR being an acronym for Video Cassette Recorder) or a DVD player (DVD being an acronym for Digital Versatile Disc).

What is claimed is:

1. Descrambling device comprising:

hardware resources containing a descrambling circuit for descrambling scrambled data representative of a program; and first memory zones to store at least two different access control codes for controlling said hardware resources for descrambling said data;

wherein said device further comprises means for sharing access to said hardware resources of said at least two different access control codes.

2. Descrambling device according to claim 1, wherein said means for sharing access to hardware resources comprises an arbitration code for selecting one access control code to control said hardware resources depending on the program selected by a user.

3. Descrambling device according to claim 1, further comprising means for downloading access control codes in said first memory zones.

4. Descrambling device according to claim 2, further comprising, for each access control code stored in said first memory zones, a second memory zone containing a code interfacing said arbitration code and said access control code.

5. Pay-TV decoder comprising a descrambling device according to claim 3.

6. TV set comprising a descrambling device according to claim 3.

7. DVD player comprising a descrambling device according to claim 3.

8. A method for descrambling scrambled data representative of a program comprising the steps of:

receiving in a descrambling device scrambled data representative of a program selected by a user;

selecting by means of an arbitration code an access control code depending on the program selected by the user; and descrambling said data using hardware resources contained in said descrambling device, wherein said hardware resources are controlled by said selected access control code.

9. The method according to claim 8, further comprising the step of downloading in a memory zone at least one access control code.

* * * * *